United States Patent Office 3,141,087
Patented July 14, 1964

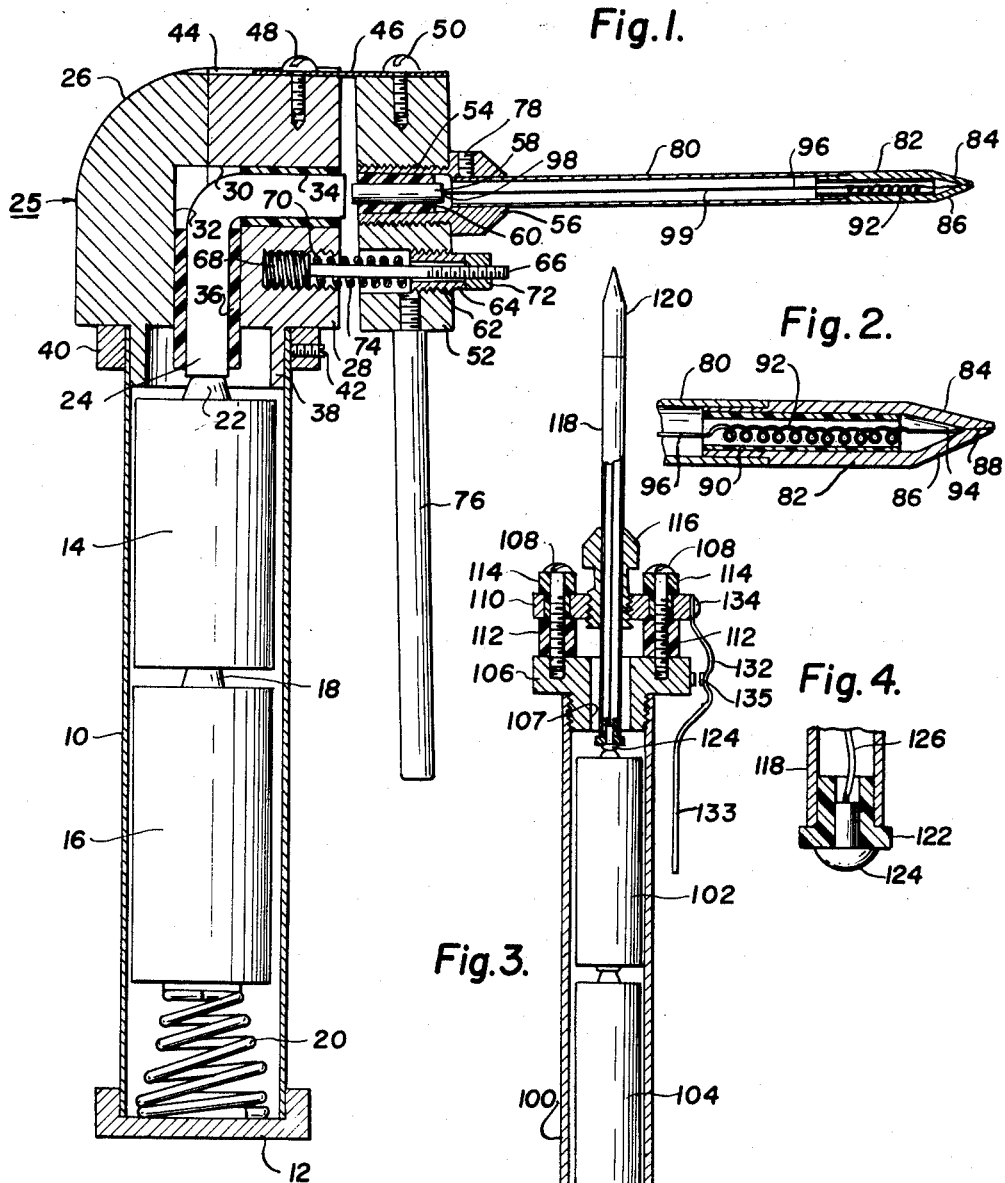

3,141,087
BATTERY POWERED ELECTRIC
SOLDERING IRON
Alexander Schoenwald, Grove City, Pa., assignor to
P. Wall Manufacturing Company, Grove City, Pa., a
corporation of Pennsylvania
Filed May 22, 1961, Ser. No. 111,579
3 Claims. (Cl. 219—233)

This invention relates to a soldering iron which may be powered by low voltage batteries, and more particularly to apparatus of the type described in which the batteries are carried within a handle for the soldering iron so as to provide a self-contained unitary tool, requiring no lead-in wires or the like.

As is known, the usual soldering iron is powered by 110-volt alternating current available from a conventional household electrical outlet. In such soldering irons, an electrical heating coil is wound around or positioned within the tip of the soldering iron; and because of the relatively high voltages employed, the coil must be insulated from the tip and handle of the iron. This, of necessity, results in very poor heat transfer characteristics between the coil and the soldering tip. That is, due to the insulation required, most of the heat must be transferred from the coil to the soldering tip by radiation due to the insulation between the coil and the tip, and a great deal of heat is lost to the surrounding air as well as the handle of the soldering iron which can heat up and cause discomfort to the user.

As an overall object, the present invention seeks to provide a soldering iron which overcomes the above and other disadvantages of conventional soldering irons and which may be powered by low voltage batteries carried within the soldering iron itself, thereby eliminating lead-in wires or the like.

Another object of the invention is to provide a soldering iron of the type described in which the batteries for the heating coil are carried within a handle for the soldering iron.

A further object of the invention is to provide a battery-powered soldering iron in which the circuit between the batteries and the heating coil for the soldering tip includes the tip and soldering iron handle itself.

Still another object of the invention is to provide a soldering iron in which the heating coil is connected directly to the soldering tip to effect a highly efficient heat transfer between the coil and tip as contrasted with the usual soldering iron wherein much heat is lost to the handle and surrounding air. In this way, substantially all of the heat generated by the coil will flow to the tip itself so that the handle need not be thermally insulated from the tip as is the case with a soldering iron employing 110-volt alternating current.

In accordance with the invention, there is provided a soldering iron having a hollow handle of electrical conducting material adapted to receive batteries, a hollow soldering tip, an electrical heating coil disposed within said tip and having one end connected directly to the tip, and means for connecting the opposite output terminals of the batteries to the tip and the other end of the coil whereby an electrical circuit may be completed to the coil through the tip itself. Preferably, the handle for the soldering iron comprises part of the circuit for supplying power to the coil; and the batteries may comprise two 1.25 volt cells connected in series, meaning that the total current flowing through the handle will be insufficient to shock or otherwise harm the user of the soldering iron. However, contrary to what might be expected, the voltage available from the batteries is sufficient to raise the tip to a soldering temperature of about 800° F. in a very short time. This is due primarily to the direct connection of the heating coil to the tip which affords excellent heat transfer characteristics between these two members. At the same time, due to the fact that the circuit to the heating coil is completed through the handle and the tip, a minimum amount of insulation is required, and the batteries eliminate the need for cumbersome lead-in wires or the like.

The above and other objects and features of the invention will become apparent from the following detailed description taken in connection with the accompanying drawings which form a part of this specification, and in which:

FIGURE 1 is a cross-sectional view of one embodiment of the present invention;

FIG. 2 is an enlarged view of the soldering tip of the embodiment of the invention shown in FIG. 1;

FIG. 3 is a cross-sectional view of another embodiment of the invention; and

FIG. 4 is an enlarged cross-sectional view of the means in the embodiment of FIG. 3 for connecting one of the battery terminals to one end of the heating coil for the soldering tip.

Referring now to the drawings, and particularly to FIG. 1, the soldering iron shown comprises a hollow handle portion 10 of electrical conducting material having an end cap 12 secured thereto by any suitable means, not shown. Carried within the handle 10 are a pair of 1.25 volt dry cells 14 and 16 connected in series in the usual manner such that the positive terminal 18 of battery 16 contacts the outer casing or negative terminal of battery 14. The outer casing of battery 16 is connected to end cap 12 and handle 10 through a compressed coil spring 20; whereas the positive terminal 22 of battery 14 engages an L-shaped copper bar 24.

As shown, the copper bar 24 is carried within a head member 25 formed from two blocks 26 and 28 which are secured together as by means of bolts, not shown. Drilled into the head member 25 are two intersecting bores 30 and 32 which provide a generally L-shaped passageway for the bar 24 which is electrically insulated from the head member 25 by means of cylindrical insulating members 34 and 36, substantially as shown.

Depending downwardly from the underside of head member 25 is an annular flange 38 which receives the upper end of the hollow handle 10. The handle is secured to the flange 38 by means of a ring 40 and set screws 42; however, any suitable fastening means may be used, depending upon requirements.

Provided in the upper surface of head member 25 is a slot 44 which receives a copper strip 46, this strip being secured to member 25 by means of a screw 48. Secured to the outer end of strip 46 by means of screw 50 is a member 52 having a centrally disposed threaded opening 54 extending therethrough. Received within opening 54 is a hollow fitting 56 which receives a second copper bar 58, this latter bar being insulated from the fitting 56 and member 52 by means of a cylindrical insulator 60.

Below the threaded opening 54 is a second, partially threaded opening 62 which receives, at its forward end, a cylindrical threaded spacer 64. Extending through the spacer 64 is a shaft 66 which is secured to a plug 68 threaded into an opening 70 in the head member 25. A nut 72 is threaded to the forward end of shaft 66, and a coil spring 74 is interposed between the plug 68 and spacer 62 whereby the member 52 will be resiliently biased outwardly from the member 25. As will be understood, the copper strip 46 is flexible; and, therefore, the member 52 may be moved inwardly toward member 25 against the force of spring 74 to bring the copper bar 58 into contact with bar 24. Upon release of the force tending to pull the member 52 inwardly toward member 25, the spring 74 will again force member 52 outwardly.

Threaded into the bottom of member 52 is a "trigger" 76 which cooperates with the hollow handle 10 in order to make or break contact between the bars 58 and 24. That is, under normal circumstances, the spring 74 will normally urge the member 52 outwardly into the position shown in FIG. 1 wherein bar 58 does not contact bar 24. However, by grasping the handle 10 and squeezing or pulling the "trigger" 76 toward the handle, contact may be made between the two bars 58 and 24.

Received within the forward end of fitting 56, and held therein by means of a set screw 78, is a tube or shank portion 80 which receives a copper soldering tip 82 at its forward end. As is best shown in FIG. 2, the forward end of tip 82 is swaged or pinched to provide two angularly disposed surfaces 84 and 86 which intersect along a seam 88. Positioned on the inner periphery of the tip 82 is a cylindrical ceramic insulating member 90 which houses a heating coil 92. As shown, the forward end 94 of the heating coil 92 is secured to the forward end of the tip 82 and is held within the seam 88. The other end 96 of the coil 92 is brazed or otherwise securely fastened to the forward end of the copper bar 58 as at 98. Preferably, there is a slight amount of tension on the lead 99 between the coil and bar 58 to hold it out of contact with shank portion 80.

With the construction shown, the soldering tip 82 may be raised to a soldering temperature of 800° F. in a matter of a few seconds by merely squeezing the "trigger" 76 so as to bring bar 78 into contact with bar 24. Under these circumstances, an electrical circuit is completed from positive terminal 22 of battery 14 through bars 24 and 58, the coil 92, tip 82, shank portion 80, members 52 and 25, handle 10 and spring 20 to the case or negative terminal of battery 16. Preferably, the batteries 14 and 16 are of the rechargeable nickel-cadmium type; however, any suitable dry cell of about 1.25 volts may be employed. The heating coil 92 comprises a chrome-nickel alloy of about 25 gage and having a resistance of about 0.4 ohm. With a total voltage of about 2.5 volts available from the batteries 14 and 16, a current of 5 amperes will flow through the coil 92 which is sufficient to bring the soldering tip 82 to the soldering temperature of 800° F. within a few seconds. This is due, in part, to the fact that the forward end 94 of the coil 92 is connected directly to the tip whereby the heat is transferred to the tip directly by conduction. This is contrasted with the usual soldering iron wherein the heat must be transferred from the coil to the soldering tip by radiation alone. At the same time, the heat generated is insufficient to raise the temperature of the other parts of the soldering iron, most of which are preferably formed from lightweight aluminum.

In FIG. 3 another embodiment of the invention is shown which, like the embodiment of FIG. 1, comprises a hollow tubular handle 100 of aluminum or the like adapted to receive batteries 102 and 104 arranged in series. Threaded into the upper end of the tubular handle 100 is an annular member 106 having a centrally disposed bore 107 extending therethrough. Secured to the member 106 by screws 108 is a second disc-like member 110. The member 106 and the screws 108 are electrically insulated from the disc-like member 110 by means of plastic or other similar insulators 112 and 114, the insulators 112 also acting as spacers between the members 106 and 110.

Threadedly received within the disc-like member 110 is a fitting 116 which, in turn, receives a shank portion 118 having a soldering tip 120 secured to its forward end. The shank portion 118 and the soldering tip 120 are identical to shank portion 80 and soldering tip 82 shown in FIG. 1; and, accordingly, these elements will not be again described in detail.

At the rearward end of the shank portion 118 is an electrical contact, possibly best shown in FIG. 4. It comprises a button-type insulator 122 which receives an electrical contact 124 brazed or otherwise securely fastened to a wire 126 which is connected to one end of a heating coil within the soldering tip 120, the other end of this coil being connected to the forward end of the soldering tip as in the embodiment of FIG. 1.

Within the end of tubular handle 100 opposite member 106 is an electrical conducting plug 128; and between the plug 128 and the battery 104 is a coil spring 130, the arrangement being such that the spring will urge the batteries 102 and 104 into engagement with the contact 124.

Since the soldering tip 120 and member 110 are insulated from member 106 and the tubular handle 100 by the insulators 112 and 114, current will not normally flow from the batteries to the heating coil in the soldering tip. In order to energize the heating coil, a simple switch device is provided comprising a leaf spring 132 having one end secured to the member 110 as by means of a rivet 134. The opposite or free end 133 of the leaf spring 132 is biased outwardly from the member 106 and handle 100, but may be pressed inwardly to engage a set of silver contacts 135, one of which is on the leaf spring 132 and the other of which is on member 106. In this manner, a circuit may be completed from batteries 102 and 104 to the heating coil in the soldering tip 120 by closing contacts 135. In using the soldering iron, the leaf spring 132 is merely pressed into engagement with the member 106 whereby current will flow through the heating coil for soldering tip 120, whereupon the soldering tip will heat up to the desired temperature of about 800° F. within a very short period of time. The combined voltages of batteries 102 and 104 is equal to that of batteries 14 and 16 in the embodiment of FIG. 1; however, it will be appreciated that due to the smaller size of the batteries in the embodiment of FIG. 3, they must be replaced or recharged more often. The advantage of the embodiment of FIG. 3 is that it is much smaller in size and may be easily held between the thumb and forefinger of the user; whereas the embodiment of FIG. 1 is larger and must be securely grasped.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A soldering iron comprising a hollow handle formed from electrical conducting material, battery means carried within said handle and having positive and negative terminals, a member of electrical conducting material secured to and electrically connected to the top of said handle, a bore extending through said member, an electrical conductor extending through said bore and having one end in engagement with one of said battery terminals, the other terminal being electrically connected to said handle, electrical insulating means between said electrical conductor and said member, a hollow relatively low mass soldering tip of electrical conducting material closed at its forward end and supported on said handle, an electrical heating coil disposed within said tip, a ceramic sleeve member interposed between said heating coil and the inner wall of said tip, the sleeve being in contact with said inner wall and spaced from said coil, an electrical connection between one end of the coil and the forward end of said hollow tip, first electrical connection means between the other end of the coil and said conductor which extends through the bore in said member, means for electrically insulating said first electrical connection means from said hollow tip, second electrical connection means between said hollow tip and the handle, one of said electrical connection means including a switch device which may be selectively closed to complete a circuit from the battery means to the heating coil, the battery means being such as to produce a voltage of about 2.5 volts, and the heating coil being formed from a chrome-nickel alloy of about 25 gauge and having a resistance of about 0.4 ohm, whereby a current of about 5 amperes will flow through the heating coil to rapidly raise the temperature of the soldering tip to the soldering temperature of about 800° F.

2. A soldering iron comprising a hollow handle formed from electrical conducting material, battery means carried within said handle and having positive and negative terminals, a first member of electrical conducting material secured to and electrically connected to the top of said handle, a bore extending through said first member, an electrical conductor extending through said bore and having one end in engagement with one of said battery terminals, the other battery terminal being electrically connected to said handle, electrical insulating means between said electrical conductor and said first member, a second member of electrical conducting material secured to said first member, means for electrically connecting said second member to the first member, a bore in the second member, a hollow soldering tip of electrical conducting material closed at its forward end and received at its other end in the bore in said second member so as to be electrically connected to said second member, an electrical heating coil disposed within said tip, an electrical connection between one end of the coil and the forward end of said hollow tip, and means for electrically connecting the other end of said heating coil to the electrical conductor extending through said bore in the first member, said last-mentioned means being electrically insulated from the tip and said second member.

3. A soldering iron comprising a hollow handle formed from electrical conducting material, battery means carried within said handle and having positive and negative terminals, a first member of electrical conducting material secured to and electrically connected to the top of said handle, a bore extending through said first member, an electrical conductor extending through said bore and having exposed ends, one of said ends being in engagement with one of said battery terminals, the other terminal being electrically connected to said handle, electrical insulating means between said electrical conductor and said first member, a second member of electrical conducting material, spring means for securing and electrically connecting said second member to the first member whereby the second member will normally be urged away from the first member, a bore in the second member a hollow soldering tip of electrical conducting material closed at its forward end and received at its other end in the bore in said second member so as to be electrically connected to said second member, an electrical heating coil disposed within said tip, an electrical connection between one end of said heating coil and the forward end of said tip, an electrical conductor in the end of said tip opposite said heating coil and having exposed ends, means electrically insulating said last-named electrical conductor from said second member, an electrical connection between the other end of said heating coil and one exposed end of said last-named electrical conductor, and means for selectively moving said second member toward the first member against the force of said spring means to make contact between the other exposed ends of the electrical conductors in the bores in said first and second members.

References Cited in the file of this patent

UNITED STATES PATENTS

| | | |
|---|---|---|
| 761,372 | Gill | May 31, 1904 |
| 874,357 | Dickens | Dec. 17, 1907 |
| 1,375,586 | Graves | Apr. 19, 1921 |
| 2,735,923 | Juvinall et al. | Feb. 21, 1956 |
| 2,900,739 | Tofield | Aug. 25, 1959 |
| 2,973,422 | Smith | Feb. 28, 1961 |

FOREIGN PATENTS

| | | |
|---|---|---|
| 415,161 | Italy | Jan. 12, 1946 |
| 946,814 | France | Dec. 27, 1948 |
| 976,256 | France | Oct. 25, 1950 |